(12) United States Patent
Clark et al.

(10) Patent No.: US 8,289,024 B2
(45) Date of Patent: *Oct. 16, 2012

(54) METHOD AND APPARATUS FOR LOCATING WELL CASINGS FROM AN ADJACENT WELLBORE

(75) Inventors: Brian Clark, Sugar Land, TX (US); Christophe Dupuis, Sugar Land, TX (US); Gerald N. Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,203

(22) Filed: Oct. 4, 2010

(65) Prior Publication Data

US 2011/0018542 A1      Jan. 27, 2011

Related U.S. Application Data

(63) Continuation of application No. 11/550,839, filed on Oct. 19, 2006, now Pat. No. 7,812,610.

(60) Provisional application No. 60/733,347, filed on Nov. 4, 2005.

(51) Int. Cl.
 *G01V 3/00* (2006.01)
 *G01V 3/12* (2006.01)
(52) U.S. Cl. .................................... 324/346; 324/338
(58) Field of Classification Search .............. 324/346, 324/338
See application file for complete search history.

(56) References Cited

U.S. PATENT DOCUMENTS

| | | | |
|---|---|---|---|
| 4,372,398 A | 2/1983 | Kuckes | |
| 4,443,762 A * | 4/1984 | Kuckes | 324/346 |
| 4,529,939 A | 7/1985 | Kuckes | |
| 4,593,770 A | 6/1986 | Hoehn, Jr. | |
| 4,700,142 A | 10/1987 | Kuckes | |
| 4,791,373 A | 12/1988 | Kuckes | |
| 4,845,434 A | 7/1989 | Kuckes et al. | |
| 4,933,640 A | 6/1990 | Kuckes | |

(Continued)

OTHER PUBLICATIONS

Lee et al., First U Tube Well Connects Horizontal Wells, Drilling Contractor, pp. 71-77, Sep./Oct. 2005.

(Continued)

*Primary Examiner* — Reena Aurora
(74) *Attorney, Agent, or Firm* — John Vereb; Kimberly Ballew

(57) ABSTRACT

A wellbore tool for locating a target wellbore containing a conductive member from a second wellbore and directing the trajectory of the second wellbore relative to the target wellbore includes an electric current driver having an insulated gap; a three-axis magnetometer positioned within a non-magnetic housing that is disposed within a non-magnetic tubular, the three-axis magnetometer positioned below the electric current driver; a drill bit positioned below the three-axis magnetometer; a hollow tubular connected between the electric current driver and the three-axis magnetometer; and a measurement-while-drilling tool. The current driver generates an electric current across the gap to the portion of the tool below the insulated gap. In a method a current is generated across the insulated gap to the portion of the tool below the insulated gap to the conductive material in the target wellbore returning to a portion of the bottom hole assembly above the insulated gap thereby producing a target magnetic field. Measuring the target magnetic field at the bottom hole assembly and the earth's magnetic field; and determining the position of the second wellbore relative to the target wellbore. Then steering the bottom hole assembly to drill the second wellbore along a trajectory relative to the target wellbore.

40 Claims, 12 Drawing Sheets

U.S. PATENT DOCUMENTS

| | | |
|---|---|---|
| 5,074,365 A | 12/1991 | Kuckes |
| 5,218,301 A | 6/1993 | Kuckes |
| 5,305,212 A | 4/1994 | Kuckes |
| 5,343,152 A | 8/1994 | Kuckes |
| 5,485,089 A | 1/1996 | Kuckes |
| 5,512,830 A | 4/1996 | Kuckes |
| 5,513,710 A | 5/1996 | Kuckes |
| 5,515,931 A | 5/1996 | Kuckes |
| 5,589,775 A | 12/1996 | Kuckes |
| 5,657,826 A | 8/1997 | Kuckes |
| 5,725,059 A | 3/1998 | Kuckes et al. |
| 5,883,516 A | 3/1999 | Steenwyk et al. |
| 5,923,170 A | 7/1999 | Kuckes |
| RE36,569 E | 2/2000 | Kuckes |
| 6,657,597 B2 | 12/2003 | Rodney et al. |
| 6,736,222 B2 | 5/2004 | Kuckes et al. |
| 6,927,741 B2 | 8/2005 | Brune et al. |
| 7,812,610 B2 * | 10/2010 | Clark et al. .................. 324/346 |
| 2002/0130663 A1 | 9/2002 | Kuckes et al. |
| 2003/0085059 A1 | 5/2003 | Kuckes et al. |
| 2003/0188891 A1 | 10/2003 | Kuckes |
| 2004/0040745 A1 | 3/2004 | Kuckes |

OTHER PUBLICATIONS

Jackson, Classical Electrodynamics, 9.2. Electric Dipole Fields and Radiation, pp. 271-273, John Wiley & Sons, Inc. (NY 1962).

* cited by examiner

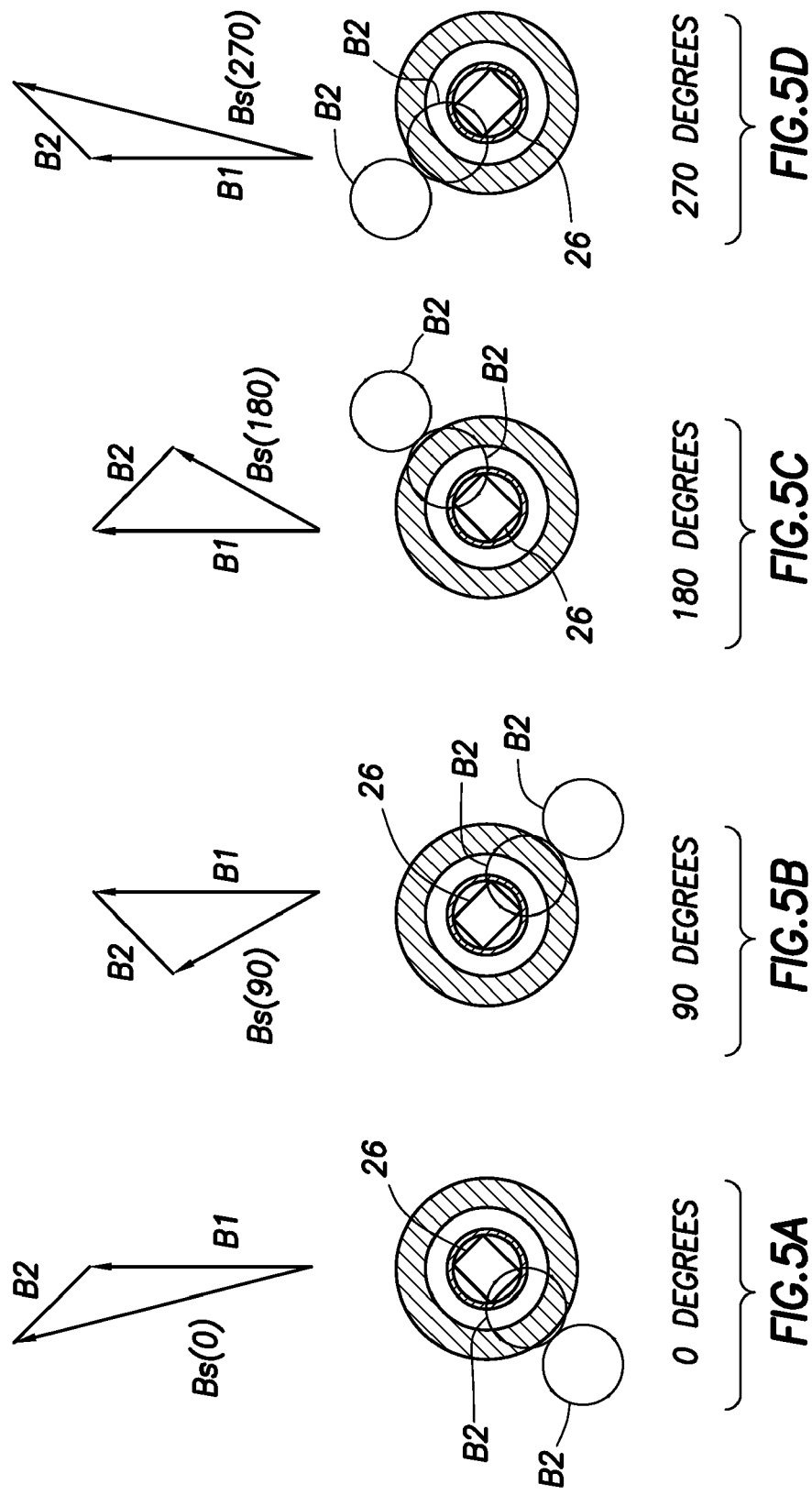

METHOD AND APPARATUS FOR LOCATING WELL CASINGS FROM AN ADJACENT WELLBORE

RELATED APPLICATIONS

This application is a continuation application and claims the benefit of U.S. patent application Ser. No. 11/550,839 now U.S. Pat. No. 7,812,610, entitled "Method and Apparatus for Locating Well Casings From an Adjacent Wellbore," filed on Oct. 19, 2006, which claims the benefit of U.S. Provisional Patent Application No. 60/733,347 filed on Nov. 4, 2005.

FIELD OF THE INVENTION

The present invention relates in general well drilling operations and more particularly to locating a casing or drill string of a first wellbore from a second wellbore while drilling the second wellbore.

BACKGROUND

In various drilling operations it is desirable to locate adjacent wellbores. Examples of drilling operations which may require locating adjacent wellbores, include relief drilling, drilling U-shaped wells, and steam assisted gravity drainage (SAGD). From time to time wells blowout and it is desired to kill the well subsurface, thus it is necessary to accurately position the first well while drilling the second intercepting relief wellbore. Currently, a common application for locating adjacent wellbores occurs when drilling a second wellbore substantially parallel to a first wellbore such as in SAGD wells.

Current methods for locating casing (or drill string) of a first wellbore use wireline tools. Conducting locating surveys utilizing wireline tools, and relying on those results, has significant drawbacks. For example, using wireline equipment increases rig time and costs. Further, wellbore location information is only obtained periodically with these wireline methods. This unavailability to have constant, timely and accurate data can result in significant and costly errors.

Therefore, it is a desire to provide an adjacent well locating device and method that addresses drawbacks of the prior art locating devices and methods. It is a still further desire to provide an adjacent well locating device and method with measurement while drilling ("MWD").

SUMMARY OF THE INVENTION

An embodiment of a wellbore tool for locating a target wellbore containing a conductive member from a second wellbore is provided. The wellbore tool includes an electric current driver having an insulated gap and at least one magnetometer positioned above or below the electric current driver. The electric current driver generates an electric current across the gap to the portions of the tool above and below the insulated gap.

In another embodiment, a wellbore tool for locating a target wellbore containing a conductive member from a second wellbore and directing the trajectory of the second wellbore relative to the target wellbore includes an electric current driver having an insulated gap; at least one magnetometer, the magnetometer positioned above or below the electric current driver; a drill bit positioned below the magnetometer; a hollow tubular connected between the electric current driver and the magnetometer; and a measurement-while-drilling tool. The current driver generates an electric current across the gap to the portions of the tool above and below the insulated gap.

An embodiment of a method of locating a target wellbore containing a conductive member from a second wellbore and directing the trajectory of the second wellbore relative to the target wellbore is provided. The method includes the steps of providing a bottom hole assembly having an electric current driver with an insulated gap, at least one magnetometer positioned above or below the electric current driver, and a drill bit positioned below the magnetometer; drilling a second wellbore spaced from the target wellbore with the bottom hole assembly; producing a low frequency current flowing from the current driver; measuring the target magnetic field at the bottom hole assembly; and determining from the target magnetic field measurements the position of the second wellbore relative to the target wellbore.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIGS. 5A-5D are illustrations of the magnetometer at various rotated positions and the associated average magnetic field measurements;

DETAILED DESCRIPTION

Figure 1:
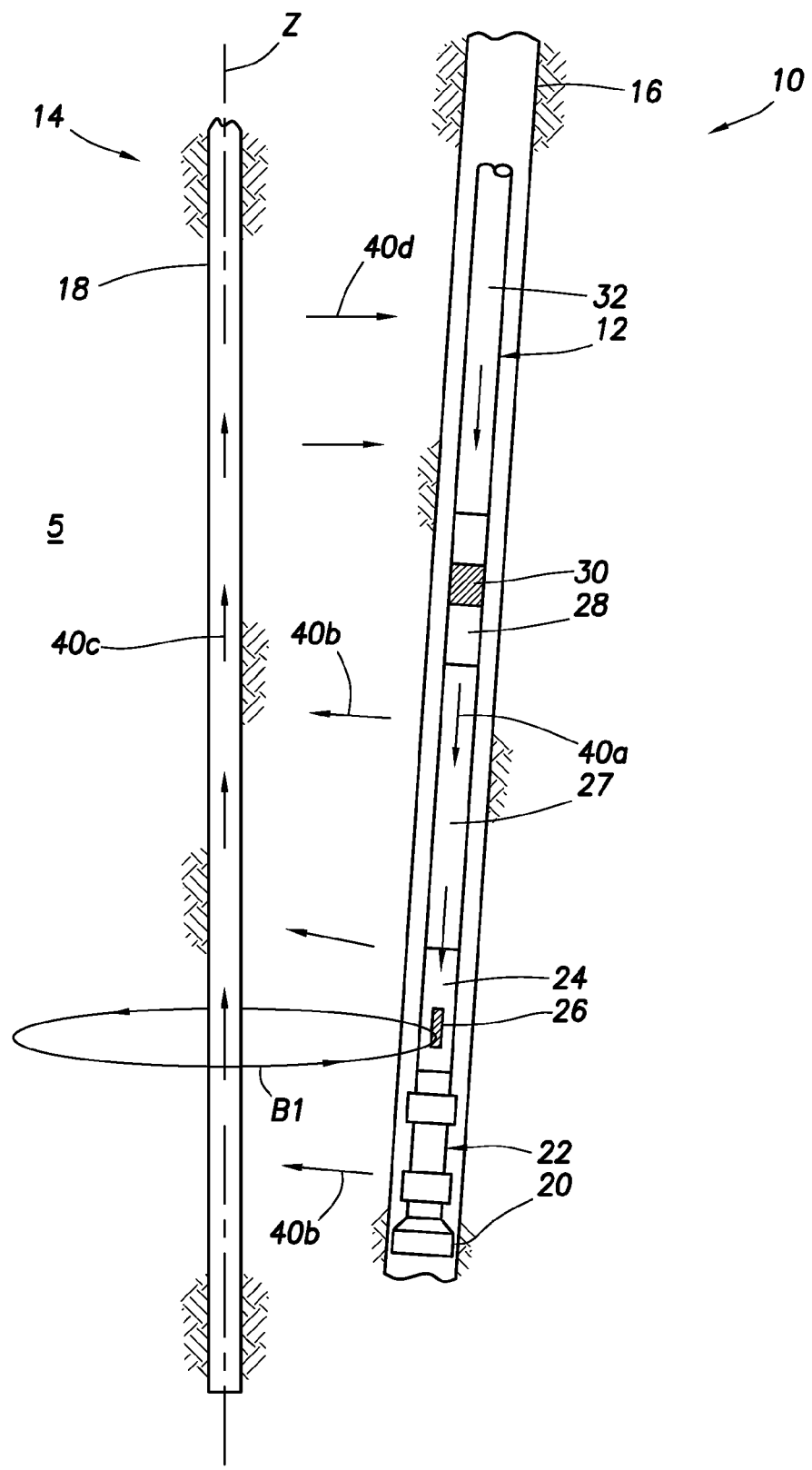
FIG. 1 is a schematic of an embodiment of a wellbore locating system of the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

FIG. 1 is a schematic of an embodiment of a wellbore locating system 10 that includes a bottom hole assembly ("BHA") 12 that is equipped to locate a target wellbore 14 in earthen formation 5 while the BHA 12 is used to drill a second wellbore 16 in formation 5, such that second wellbore 16 may be positioned as desired and guided along a desired trajectory. Target wellbore 14 has been completed with target casing 18.

In the example shown in FIG. 1, BHA 12 includes a drill bit 20, steerable system 22, a magnetometer tool 24 with a three-axis magnetometer 26, and an electric current driving tool 28 having an insulated gap 30 in operational connection with one another. Preferably BHA 12 further includes at least one drill collar 27 positioned between three-axis magnetometer tool 24 and current driving tool 28. BHA 12 is run on drill pipe 32. It is noted that BHA 12 may further include logging-while-drilling (LWD) tools, measurement-while-drilling (MWD) tools, telemetry tools, as well as other downhole tools for use in a drilling environment. It is also noted that a magnetometer tool may include other sensors, such as accelerometers.

Electric current driving tool 28 may be, for example, Schlumberger's E-Pulse or E-Pulse Express (add reference patent). For purposes of brevity, current driving tool 28 may be referred to herein as E-Pulse 28, although other current driving tools may be utilized without departing from the scope of the claimed invention. In the illustrated embodiment, the magnetometer tool 24 includes measurement-while-drilling (MWD) and telemetry (mud pulse or electromagnetic) components. It is noted that in some operations, a different configuration may be used. For example, in one example, the current driving tool may be an electromagnetic telemetry tool. In another example, a BHA 12 may include a mud pulse telemetry tool and a current driving tool.

Figure 2:
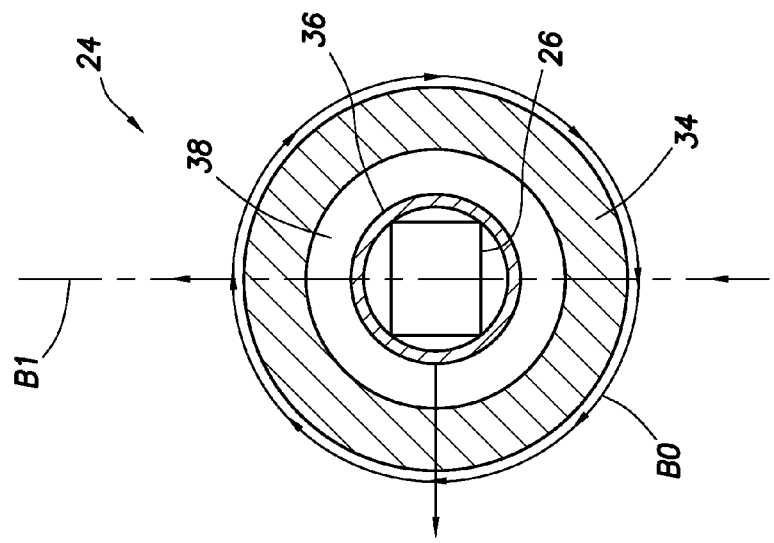
FIG. 2 is a cross-sectional view of an embodiment of a wellbore locating tool revealing a magnetometer.

FIG. 2 is a cross-sectional view of one example of a magnetometer tool 24 with three-axis magnetometer 26. Three-axis magnetometer 26 is positioned within a drill collar 34, which may be constructed of a non-magnetic metal such as stainless steel or beryllium copper; both of which are commonly used as drill collar material. The wall thickness of drill collar 34 is typically an inch or greater. Three-axis magnetometer 26 may be carried in a non-magnetic pressure housing 36 centered within drill collar 34. A channel 38 is provided between pressure housing 36 and the interior wall of drill collar 34 for drilling mud.

With reference to FIGS. 1 and 2, current driving tool 28 generates an electric current 40a across insulated gap 30. For example, electric current 40a may have a frequency between about 1 Hz and about 100 Hz, and with amplitude up to about 17 amps. Current 40a flows along BHA 12 and enters formation 5, shown as current 40b. In oil-based mud (OBM), most of current 40a will leave through drill bit 20 and will return to BHA 12 as current 40d above insulated gap 30 through stabilizers (not shown) and drill pipe 32 in contact with the wall of wellbore 16. In water-based mud (WBM), current 40a will flow out of BHA 12 along its length as current 40b. Current 40a decreases in an approximately linear manner between insulated gap 30 and drill bit 20 in WBM. When casing 18 is adjacent to BHA 12, some of current 40b will concentrate on casing 18, shown as current 40c, and return to the upper portion of BHA 12, shown as current 40d, after traveling along casing 18.

Target casing 18 provides a very low resistance path compared to formation 5, as the conductivity of casing is typically six orders of magnitude greater than formation conductivity. For example, the resistance of 9⅝ inch casing is roughly equivalent to a cylinder of 1 ohm-m formation with a diameter of 500 feet. This high contrast results in much more current returning on the casing than in the formation when casing 18 is near tool 12.

Electric current 40c on casing 18 produces magnetic field $\vec{B}_1$, which is an azimuthal magnetic field centered on target casing 18. The presence of magnetic field $\vec{B}_1$ indicates that target casing 18 is nearby, and the intensity and orientation of magnetic field $\vec{B}_1$ can be used to estimate the direction from BHA 12 to target casing 18 and thus wellbore 14.

Current 40c on target casing 18 will be weaker than current 40a on BHA 12, but will have the same frequency and be in phase with it. With current 40c represented I', azimuthal magnetic field $\vec{B}_1$ centered on target casing 18 is given approximately by Eq. 1:

$$\vec{B}_1(z) = \frac{\mu_0 I'}{2\pi r} \psi \qquad \text{(EQ. 1)}$$

Where $\mu_0 = 4\pi \cdot 10^{-7}$ Henry/m, r is the radial distance (m) from target casing 18 at axial location z to BHA 12, and ψ is the unit vector in the azimuthal direction. Measuring magnetic field $\vec{B}_1$ provides information about the direction and distance of target casing 18 relative to BHA 12.

Magnetic Field $\vec{B}_1$ from target casing 18 will penetrate drill collar 34 and pressure housing 36 provided the frequency is sufficiently low. The skin depth in a metal with conductivity σ and magnetic permeability μ' is given by Eq. 2, where f is the frequency.

$$\delta = (\pi f \mu' \mu_0 \sigma)^{-1/2} \qquad \text{(EQ. 2)}$$

For example, non-magnetic steel (μ'=1) used in drill collars typically has a conductivity σ=1.4·10⁶ S/m. At 10 Hz, the skin depth is 5.3 inches (0.13 m), so magnetic field $\vec{B}_1$ can reach magnetometer 26 for frequencies of 10 Hz and lower with very little attenuation.

Magnetic field $\vec{B}_1$ will be perpendicular to a radius from target casing 18 to the point of observation, i.e. magnetometer 26. Hence, by analyzing magnetic filed $\vec{B}_1$, three-axis magnetometer 26 can be utilized to determine a direction that either points toward or away from target casing 18. Provided that the distance to target casing 18 is less than a skin depth in formation 5, magnetic field $\vec{B}_1$ will be in phase with the source current 40a. This condition is easily met since the skin depth in a 1 ohm-m formation is 5200 feet (1.6 km) at 10 Hz.

In FIG. 1, target casing 18 is located to the left of second wellbore 16 and BHA 12 and the current 40a flows down in BHA 12. This results in a magnetic field pointing into the page at three-axis magnetometer tool 24. If target casing 18 were located to the right of BHA 12, then magnetic field $\vec{B}_1$ would point out of the page. Thus, the direction of magnetic field $\vec{B}_1$ can be used to resolve the direction to target casing 18.

Figure 3:
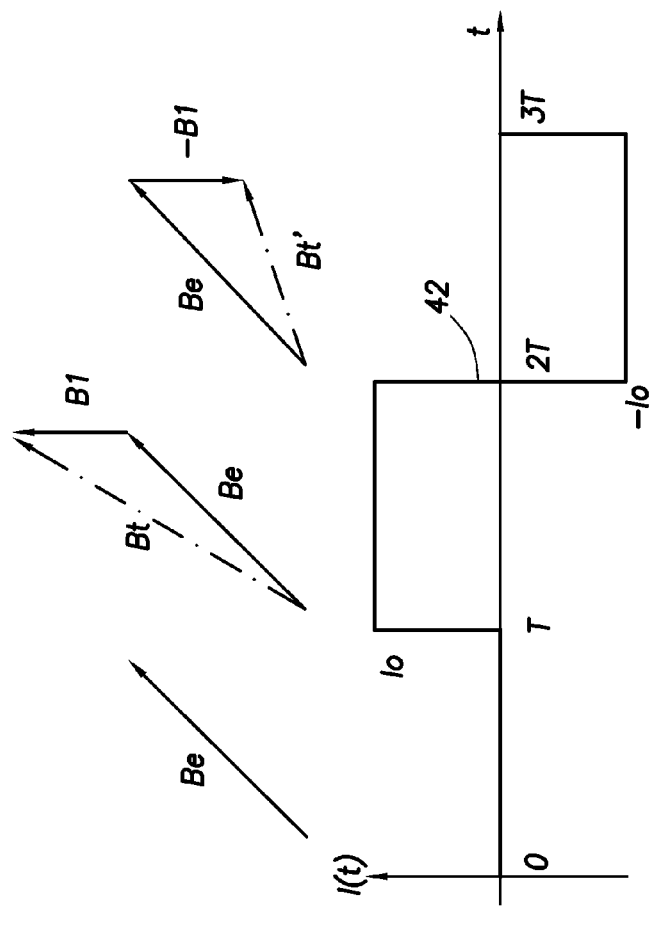
FIG. 3 is a schematic of an embodiment of a data acquisition sequence.

FIG. 3 is a schematic illustrating one example of a data acquisition sequence. Signal 42 represents an electric current that is cycled off, and then cycled on in two periods in which the current reverses polarity. Signal 42 may be used to drive electric current 40*a* through locating tool 12. FIG. 3 assumes BHA 12 is stationary during data acquisition for purposes of description, however target casing 18 may be located and positioned relative to BHA 12 while drilling wellbore 16 and thus with BHA 12 moving, for example, it may be rotating.

Signal 42 has a magnitude of zero between the time interval (0, T), which is shown in FIG. 3 as a first time interval between time 0 and time T. During time interval (T, 2T), signal 42 is "on" with a magnitude of I(t)=Io. Time interval (T, 2T) is a second time interval between times T and 2T. During the time interval (2T, 3T), which is a third time interval between time 2T and time 3T, signal 42 is "on" with a negative magnitude of I(t)=−Io. The corresponding magnetic field vectors measured by the magnetometer during these three periods are shown in the upper portion of FIG. 3.

For the first time interval, which is the interval between time 0 and time T, magnetometer 26 senses vector $\vec{B}_e$, which represents the Earth's magnetic field. Since magnetometer 26 is a three-axis magnetometer, vector $\vec{B}_e$ contains information regarding the spatial orientation and magnitude of the magnetic field in which magnetometer 26 is immersed. In the second time interval between time T and time 2T, magnetometer 26 senses a vector representing the sum of the Earth's magnetic field and magnetic field $\vec{B}_1$. The vector sensed during the second time interval is shown in FIG. 3 as vector $\vec{B}_t$ and is given by $\vec{B}_t = \vec{B}_e + \vec{B}_1$. In the third time interval between time 2T and time 3T, magnetometer 26 senses vector $\vec{B}'_t$, which is the magnetic field resulting from reversing the direction of current 40*a*. Vector $\vec{B}'_t$ is represented by the equation $\vec{B}'_t = \vec{B}_e - \vec{B}_1$.

Using data acquired by magnetometer 26 during the three time intervals shown in FIG. 3, magnetic field $\vec{B}_1$ from target casing 18 can be calculated. Magnetic field $\vec{B}_1$ from target casing 18 can be obtained by accounting for the effect of the Earth's field, vector $\vec{B}_e$, in either vector $\vec{B}_t$ or vector $\vec{B}'_t$. Alternatively, magnetic field $\vec{B}_1$ can be determined by the equation: $\vec{B}_1 = (\vec{B}_t - \vec{B}'_t)$. Note that it is not necessary for source 28 producing electric current 40*a* to produce exactly the same amplitudes for positive and negative polarities, since the direction of $\vec{B}_1$ is more important than its amplitude, and its direction does not depend on the amplitude of the current, but on the relative positions of locating tool 12 and target casing 18.

In one example, the time period, T, may have a duration ranging between 10 milliseconds and 10 seconds, depending on the time required for a good signal to noise ratio regarding measurements by magnetometer 26. The signal strength depends on several factors, including the amplitude of electric current 40*a*, the distance between target casing 18 and BHA 12, whether target casing 18 and BHA 12 are parallel, the electrical resistance of formation 5, the electrical resistance of the mud, and the electrical resistance of the contact between BHA 12 and formation 5 in oil-based mud. Any noise depends on properties of magnetometer 26 and its electronic components, the integration time, and any parasitic signals that may arise from any imperfections on electronics associated with target casing 18 or BHA 12, from tool vibration in the Earth's magnetic field, or from the magnetic field on BHA 12 due to electric current 40*a*.

Let I(z) be the axial current 40*a* at the location of magnetometer 26, where z is the axial distance from the gap. This current produces an azimuthal magnetic field $\vec{B}_0(z)$, shown in FIG. 2. Calculations regarding magnetic field $\vec{B}_0(z)$ can be performed if the axial current is represented as I(z), drill collar 34 has an inner radius of r=a, and drill collar 34 has an outer radius of r=b. At r=b, the axial current I(z) produces an azimuthal magnetic field given by $$\vec{B}_0(z) = \frac{\mu_0 I(z)}{2\pi b}\hat{\theta},$$

where $\hat{\theta}$ is the unit vector in the azimuthal direction. Since I(z)>I' and d b, hence $|\vec{B}_0| \, |\vec{B}_1|$. It is important that magnetometer 26 be insensitive to magnetic field $\vec{B}_0$.

If drill collar 34 and pressure housing 36 of magnetometer tool 24 are cylindrically symmetric, the axial current I(z) will also be cylindrically symmetric. This axial current will penetrate into the cross-sectional area of the drill collar, and a cylindrically symmetric current density $\vec{J}(r) = J(r)\hat{z}$ can be defined with units of amps/m$^2$, where $\hat{z}$ is the unit vector in the z-direction. By cylindrical symmetry, we mean that J(r) is not a function of the azimuth angle θ. If J(r)=0 for r<a, then the magnetic field will also be zero for r<a everywhere inside the drill collar. This follows from Maxwell's equations for electromagnetism and by evaluating the integrals $\oint \vec{B} \cdot \vec{dl} = \mu_0 \iint \vec{J}(r) \cdot \hat{z} \, dx \, dy$ where the left-hand line integral is evaluated over a circle of radius r<a and the right-hand area integral is evaluated over the cross-sectional area of that circle. This result does not hold true if $\vec{J}(r) \neq 0$ anywhere inside the drill collar 34. Thus, it is important that none of electric current 40*a* be allowed inside the drill collar 34 via wires, feedthroughs, or other paths. In particular, there should be no hard-wired connection, such as on an internal bus, between the internal parts of the current driver 28 tool and magnetometer tool 24. Further, there should preferably be at least one hollow section of drill collar 27 between current driving tool 28 and magnetometer tool 24.

Figure 4:
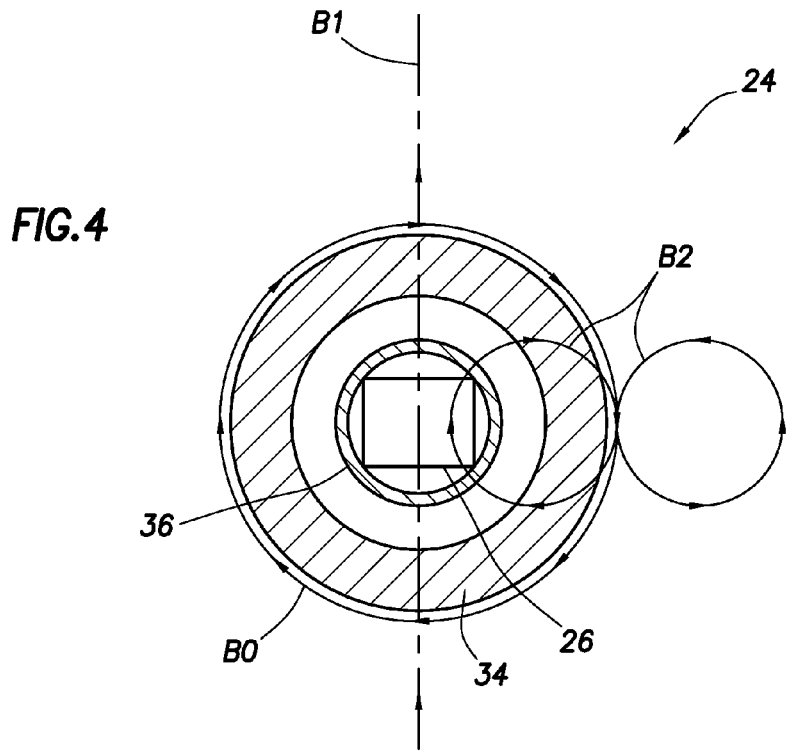
FIG. 4 is a cross-sectional view of a wellbore locating tool at the magnetometer illustrating magnetic fields with an asymmetric drill collar.

As illustrated in FIG. 4, if there is a slight asymmetry in drill collar 34, then it is possible that a weak secondary magnetic field, such as parasitic field $\vec{B}_2$, could penetrate magnetometer 26. The localized fields potentially influencing magnetometer 26 can be modeled as a cylindrically symmetric field $\vec{B}_0$ plus a much smaller asymmetric parasitic field $\vec{B}_2$ which is a function of θ and r. Parasitic field $\vec{B}_2$ arises from a magnetic dipole source, for example from a hole through drill collar 34 (H. A. Bethe, Phys. Rev. 66, p 163, 1944).

The parasitic field $\vec{B}_2$ can be accounted for and removed from the data with the following procedure, if parasitic field $\vec{B}_2$ is not too large compared to magnetic field $\vec{B}_1$. First, assume that the Earth's magnetic field has been removed using the alternating current method described above in conjunction with FIG. 3. After this process, as illustrated in FIG.

5, the residual magnetic field $\vec{B}_s$ is the sum of magnetic field $\vec{B}_1$ and parasitic field $\vec{B}_2$, given by the equation $\vec{B}_s=\vec{B}_1+\vec{B}_2$.

In FIG. 5A through 5D, the bottom views represent three-axis magnetometer 26 (tool 24) of FIG. 4 rotated to four separate angles 0°, 90°, 180°, and 270° respectively. These are known as the toolface angle or $\theta_{TF}$. The toolface angle refers to the orientation of the magnetometer 26, and not to the source of the asymmetric field $\vec{B}_2$. The tool face angle is measured with respect to gravity, as determined using accelerometers mounted in the magnetometer tool 24. The upper views of FIGS. 5A through 5D represent the residual magnetic fields $\vec{B}_s$ generated at the corresponding angles. Note that the orientation of parasitic field $\vec{B}_2$, depends on the orientation of the drill collar 34, while the magnetic field $\vec{B}_1$ is constant in direction and amplitude. Accordingly, if the residual field is obtained as a function of the orientation of the drill collar 34 (or toolface), then parasitic field $\vec{B}_2$ can be removed via signal processing. A simple example is shown in FIGS. 5A through 5D where the residual magnetic fields $\vec{B}_s(0)$, $\vec{B}_s(90)$, $\vec{B}_s(180)$ and $\vec{B}_s(270)$ is measured at four angles 0°, 90°, 180°, and 270° respectively. The average of these four readings eliminates parasitic field $\vec{B}_2$, and magnetic field $\vec{B}_1$ is given by $\vec{B}_1=\{\vec{B}_s(0)+\vec{B}_s(90)+\vec{B}_s(180)+\vec{B}_s(270)\}/4$.

It is not necessary to make the measurements at the particular angles illustrated in FIGS. 5A through 5D, a few measurements at random angles are sufficient so long as they are distributed around 360° of toolface. It is clear that the parasitic magnetic field for random angles forms a circle centered on the casing magnetic field. Simple trigonometry could then be used to solve for magnetic field $\vec{B}_1$ using the known values for the toolface at each sample $\vec{B}_s(\theta_{TF})$.

Alternatively, if drill collar 34 is rotating smoothly, it is possible to acquire continuous measurements from magnetometer 26. If the magnetic field readings are averaged over several drill collar 34 rotations, then the parasitic field $\vec{B}_2$ will average to zero. The toolface may be obtained from accelerometers, provided the drilling shocks are not too great. Hence, a potential procedure is to average the readings over several rotations with the source current with positive polarity, then average the readings with the opposite polarity of the source current. Let these two averages be $\langle\vec{B}_t\rangle$ and $\langle\vec{B}'_t\rangle$ then the magnetic field $\vec{B}_1$ is given by $\vec{B}_1=\{\langle\vec{B}_t\rangle-\langle\vec{B}'_t\rangle\}$. The difference in the last equation removes the Earth's magnetic field component.

Intercepting an exiting wellbore with a second well is used for killing blow-outs and for drilling "U-shaped wells". In a blow-out, the first well encounters an unexpectedly high pressure formation during drilling. If the weight of the drilling mud is too low, the formation pressure exceeds the borehole pressure and fluids from the formation enter the wellbore in an uncontrolled manner. The formation fluids blow the drilling mud out of the annulus between the formation and the drill string. Since the formation fluids are less dense than the mud, the pressure at the surface can become very high. This is a serious situation that may endanger people and the environment and that may damage the drilling rig and the reservoir. If standard drilling control methods (e.g. "weight and wait") cannot reestablish a greater pressure in the borehole than in the formation, the extreme measure of drilling a relief well is undertaken. A second wellbore is drilled from an offset location and attempts to intercept the first well a short distance above the blown-out formation. Wireline magnetic ranging methods are used where the drilling BHA in the second well is periodically removed and a wireline tool is run in the open hole of the relief well (see U.S. Pat. No. 4,372,398). The wireline tool of U.S. Pat. No. 4,372,398 has two widely spaced, current injecting electrodes, and a sonde with a magnetometer located midway between them. The injected current concentrates on the drill string in the first well, and the resulting magnetic field is measured with the magnetometer to determine the relative bearing of the first well with respect to the second well. By taking several bearings at different locations in the relief well, it is also possible to determine the distance to the blow-out. Eventually, the relief well is able to intercept the blow-out, but this may require a large number of trips, i.e. the drill string is removed and a wireline magnetic ranging tool is run into the open hole. Each trip may require one or more days of rig time, so the process can be very slow and expensive. The relief well has a very heavy mud that can "kill" the blow-out by reestablishing a borehole pressure greater than the formation pressure.

Figure 6:
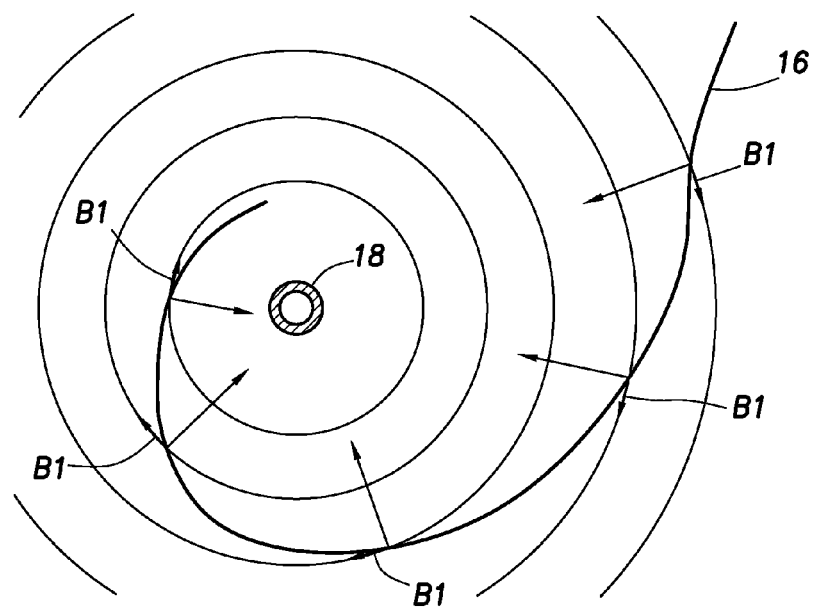
FIG. 6 is a schematic a plan view of a target casing and the trajectory of a second wellbore.

As the process of determining the relative bearing and distance to target casing from a wellbore is known in the art for wireline magnetic ranging, it is therefore briefly described with reference to FIG. 6 for BHA 12. FIG. 6 provides a plan view of the trajectory or path of second wellbore 16 and target casing 18. BHA 12 (not shown) is positioned within wellbore 16 and the distance to target casing 18 is determined via triangulation. The target casing magnetic field $\vec{B}_1$ induced by current in the target casing 18 is measured at various locations with magnetometer 26 in BHA 12 while wellbore 16 is being drilled. As is evident from the description of the present invention with reference to FIGS. 1 through 5, BHA 12 may be utilized to both drill wellbore 16 and to measure magnetic field $\vec{B}_1$. Utilizing the various readings of casing magnetic field $\vec{B}_1$, at various angles relative to target casing 18, the distance between the two wells may be simply calculated using triangulation.

Prior to the present invention, it was necessary to pull the BHA out of the wellbore and run a wireline magnetic ranging tool to locate the target casing. Then go back in the wellbore with the BHA to continue drilling operations. System 10 of the present invention may facilitate tracking the location of target casing 18 relative to wellbore 18 without removing the BHA from the wellbore, thus significantly reducing time, costs and improving the accuracy in drilling the second wellbore.

A second application for intercepting a first wells from a second well is to create a "U-shaped" well. Two horizontal wells are drilled from different locations and intercept "toe-to-toe" underground (see "First U-tube well connects horizontal wells", *Drilling Contractor*, September-October 2005). One purpose for drilling a U-shaped well is to lay cables or pipelines under a river. Another purpose is to provide a pipeline from land to an offshore well, where the stability of the seafloor cannot support a seafloor pipeline. Another purpose may be to produce heavy oil through hot subsurface formations, rather than through a seafloor pipeline exposed to cold water. Cold pipelines increase the viscosity of the heavy oil and may prevent it s production. To drill a U-shaped well, a first well is drilled and cased. As the second well is drilled and approaches the end of the first well, a wireline tool must be inserted in the first well for magnetic ranging. This requires a rig be maintained on the first well to deploy the wireline tool in the horizontal well.

An example of a method of operating wellbore locating system 10 is now described with reference to FIGS. 1 through 5. There are several possible strategies for activating the data acquisition process and one such process is described herein. Typically, drilling of second wellbore 16 proceeds slowly (~50 ft/hr) and the distance and direction of target casing 18 relative to wellbore 16 does not change rapidly. Therefore, there may be no need or desire to continuously measure the relative bearing to target casing 18.

Upon initiation of the data acquisition sequence, current driver 28 cycles current 40a off, current 40a on, and current 40a reversed with a predetermined time interval T. In one example, the method is conducted as shown in FIG. 3. Similarly, MWD tool 24 may begin the measurement sequence when it detects the initiation of the acquisition sequence. Magnetometer 26 initially reads the Earth's magnetic field. When current driver 28 sends current 40a down locator tool 12, magnetometer will detect a change in the magnetic field if a casing is present. When current 40a is reversed, magnetometer 26 will again detect the change in magnetic field. Without a direct communication and synchronization path between current driver 28 and MWD tool 24, the MWD tool will deduce the periods of off, on, and reversed current. This can be done by correlating the magnetometer data to the known timing sequence. For example, the previously described sequence was current off for the first time interval (0,T), current on for the second time interval (T, 2T), and current reversed for the third time interval (2T, 3T). This could be repeated for a predetermined number of cycles. The MWD tool 24 would then compute the cross-correlation between the current profile and the magnetometer data to obtain three values of the magnetic field. Using unequal periods, for example, current off during (0, 2T), current on during (2T, 3T), and current reversed during (3T, 4T) would unambiguously mark the current off, on, and reversed periods. Since current driver 28 may be programmed to begin the current with a known phase (e.g. positive), there would be no ambiguity about the sign of the direction toward the casing.

Once the data has been processed to obtain Earth's magnetic field ($\vec{B}_e$) and $\vec{B}_s(\theta_{TF})$, where $\theta_{TF}$ is the toolface, MWD tool 24 can transmit this information to the surface. The BHA can then be rotated and stopped at another toolface angle, and the process repeated to obtain another reading, $\vec{B}_s(\theta'_{TF})$ at the new toolface angle. If no parasitic magnetic field $\vec{B}_2$ is detected, then it may not be necessary to take measurements with multiple toolface angles.

Wellbore locating system 10 of the present invention is of particular interest for steam assisted gravity drainage (SAGD) production operations. SAGD requires at least two horizontal wells to be drilled parallel to each other. One well is positioned directly above the other well, and typically with a constant separation, for example of 3 to 5 meters. These wells can be completed with casing or slotted liners. Once the wells are completed, steam is injected in the upper well and the hydrocarbons are produced from the lower well.

Figure 7:
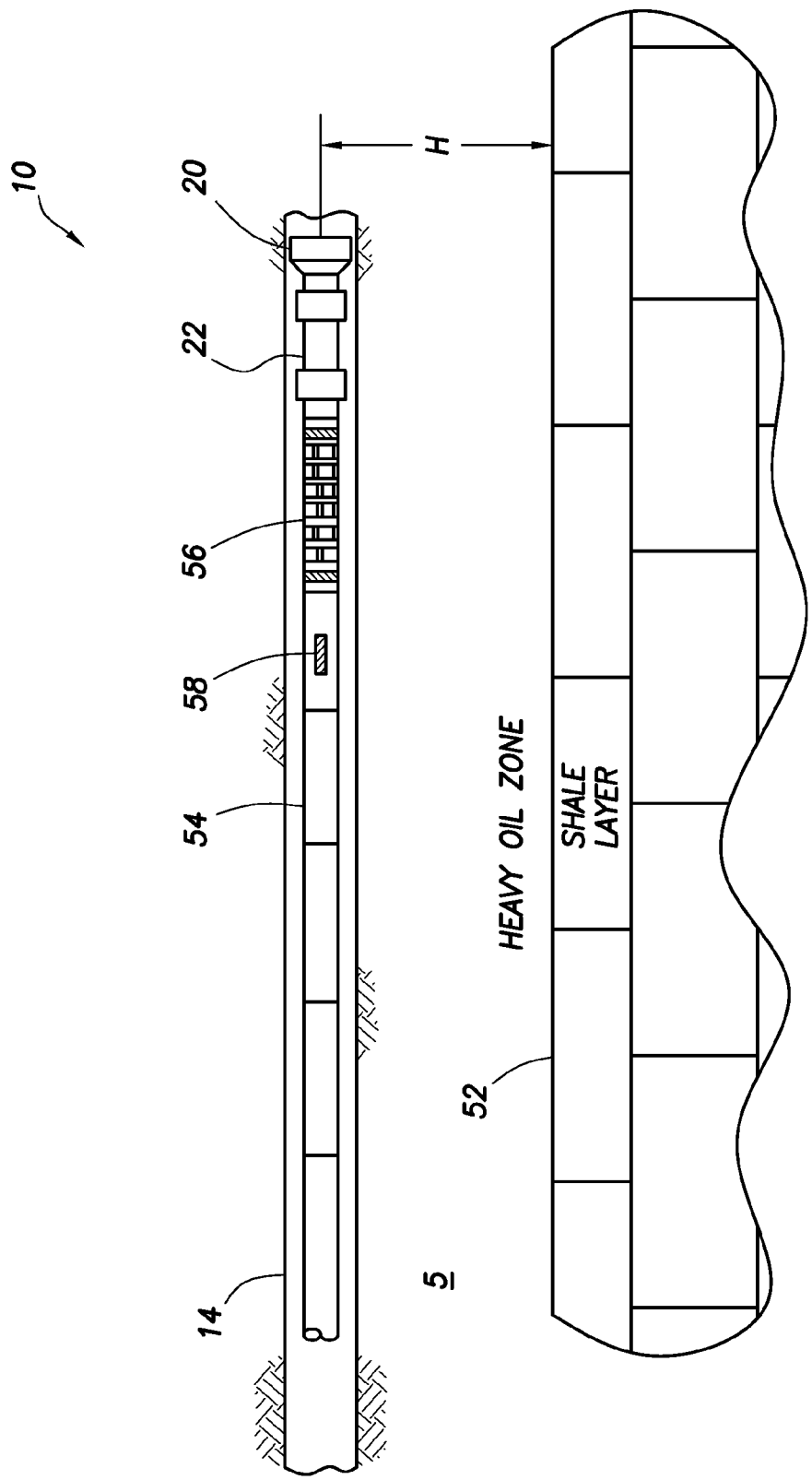
FIG. 7 is a schematic illustrating the drilling of a first wellbore in for SAGD operations.

An embodiment of a method of drilling a first well 14 and a second well 16 for SAGD operations is now described with reference to FIGS. 1 through 8. Referring to FIG. 7, first horizontal wellbore 14 is drilled using established techniques developed for geosteering wellbores parallel to an interface, such as the heavy oil-shale interface 52. The drilling assembly, shown as BHA 54 typically includes a drill bit 20, a steerable system 22, LWD system 56 (containing, for example, tools for measuring resistivity, gamma-ray, sonic, and/or nuclear tools), and an MWD system 58 to provide direction, inclination, and telemetry, for example. LWD system 56 may include Schlumberger's PeriScope15 or a similar system, that can measure the formation resistivity up to about 15 ft away from the BHA; the formation resistivity azimuthally around the BHA; and it can determine vertical and horizontal resistivities if the formation is anisotropic. LWD 56 may measure the resistivity at bit 20 and provide high resolution images of the borehole wall, which may provide information about fine bedding. Thus, LWD 56 resistivity tools may provide an extremely detailed map of the formation resistivity in a relatively large volume surrounding the wellbore. Wellbore 14 is completed with casing 18.

Figure 8:
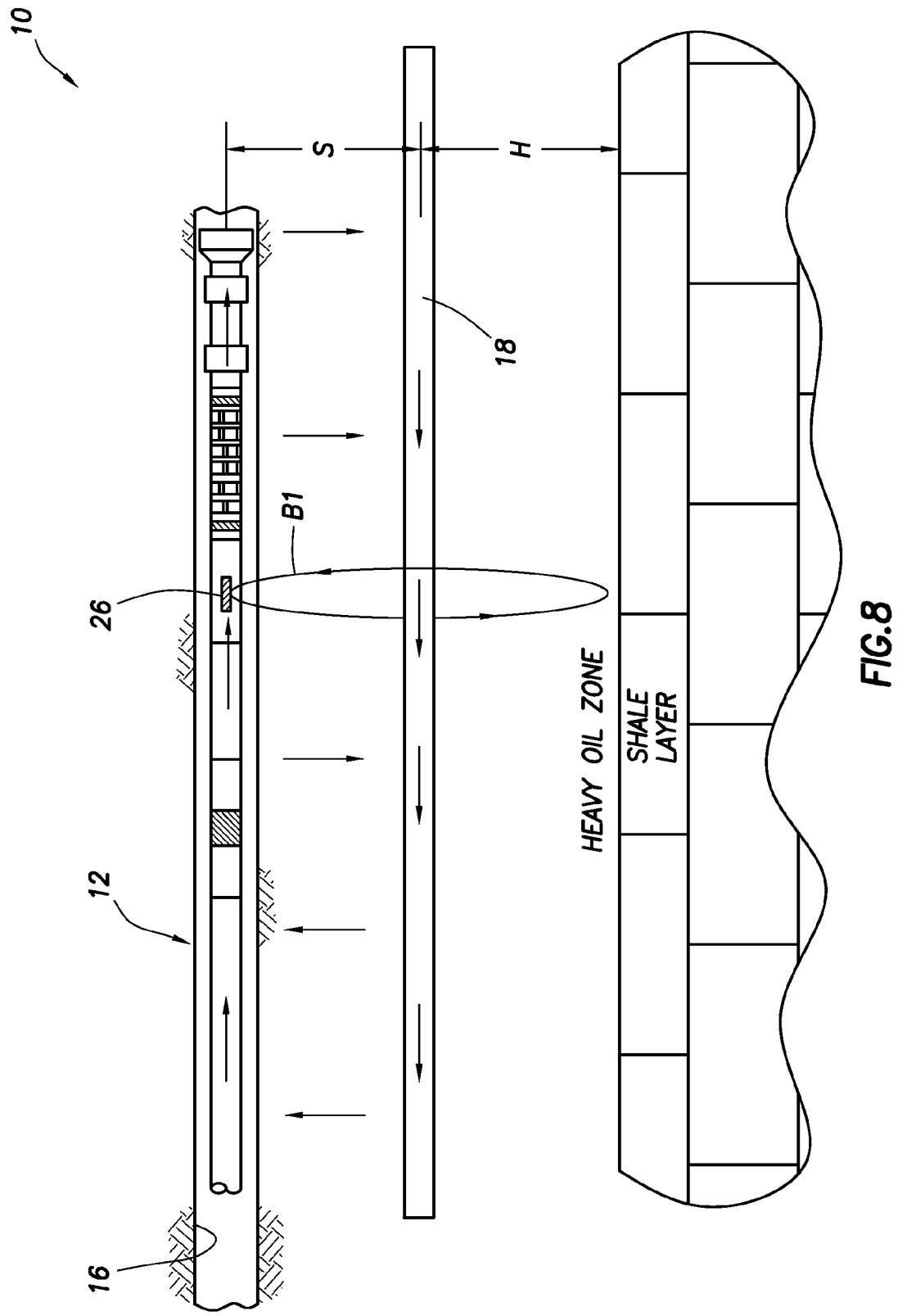
FIG. 8 is a schematic illustrating the drilling of a second wellbore relative to the first wellbore of FIG. 7.

As illustrated in FIG. 8, second wellbore 16 is drilled directly above (or below) first wellbore 14 using BHA 12 that includes a locating tool. BHA 12 is described with reference to FIGS. 1 and 2 and may further include a LWD system 56. As previously described, electric current 40 induces magnetic field $\vec{B}_1$ around target casing 18. Magnetic field $\vec{B}_1$ may be analyzed to determine the direction and distance of target casing 18 relative to tool 12. For SAGD operations it is desired to maintain second wellbore 16 a substantially constant distance S from target casing 18. Thus, triangulation, which requires undulating the trajectory of wellbore 16, may not be desired. Therefore, alternative methods for determining and maintaining separation distance S are provided.

Figure 9:
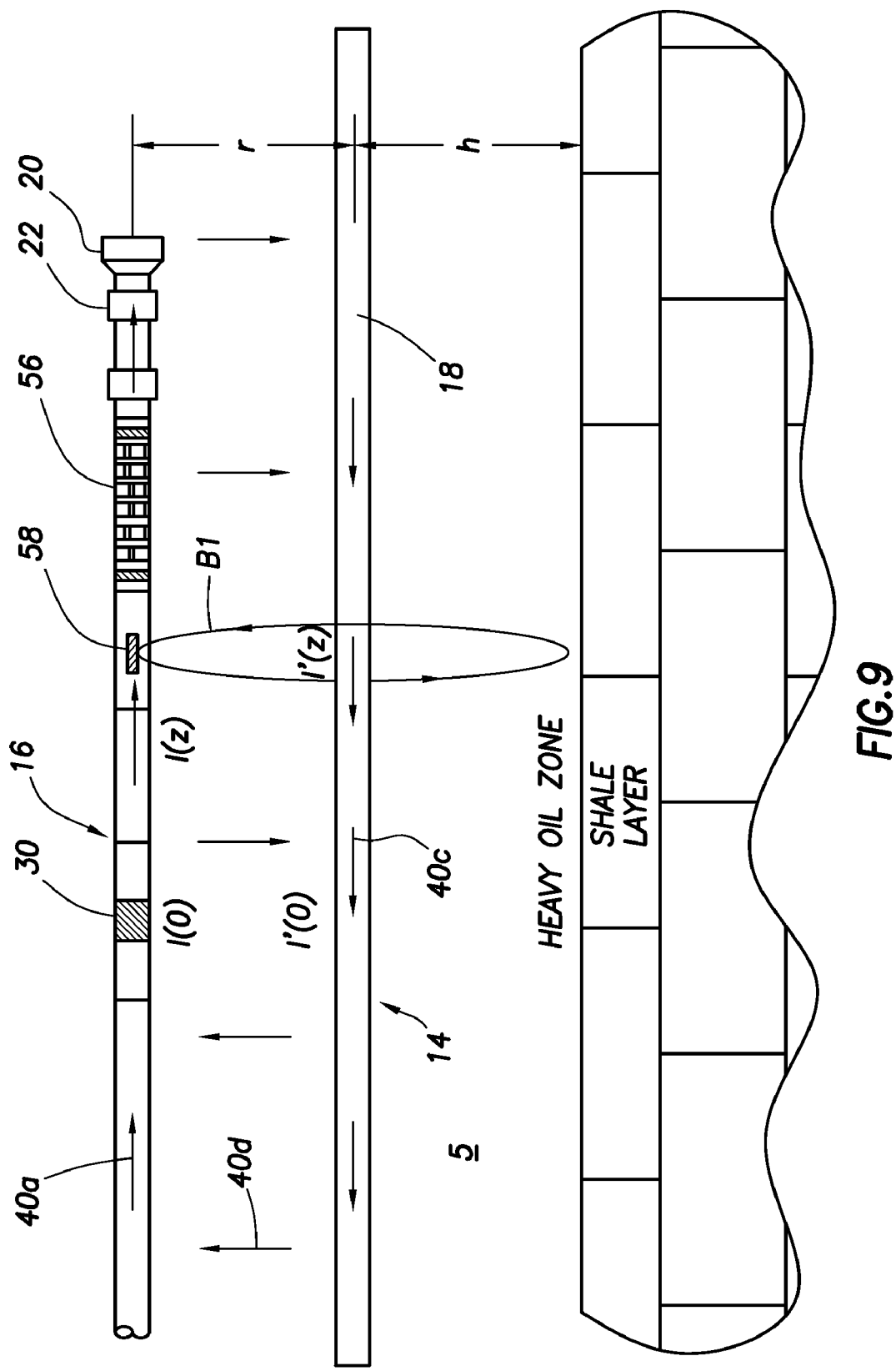
FIG. 9 is a schematic illustrating one example of drilling a SAGD well above a cased well showing the direction of current flow.

An example of an algorithm is now presented to illustrate how the second SAGD well can be positioned with respect to the first well based on magnetic field measurements. Normally, the first well drilled is the lower, producing well 14 (see, e.g., FIG. 7). After the first well 14 has been cased, the upper, second well 16, also called an injector well, is drilled parallel to the first well 14 (FIG. 9). As shown in FIG. 9, the second well 16 is drilled using a BHA 22 that includes a drill bit 20, a steerable system, 22, an LWD tool 56, and a three-axis magnetometer 58.

Figure 10:
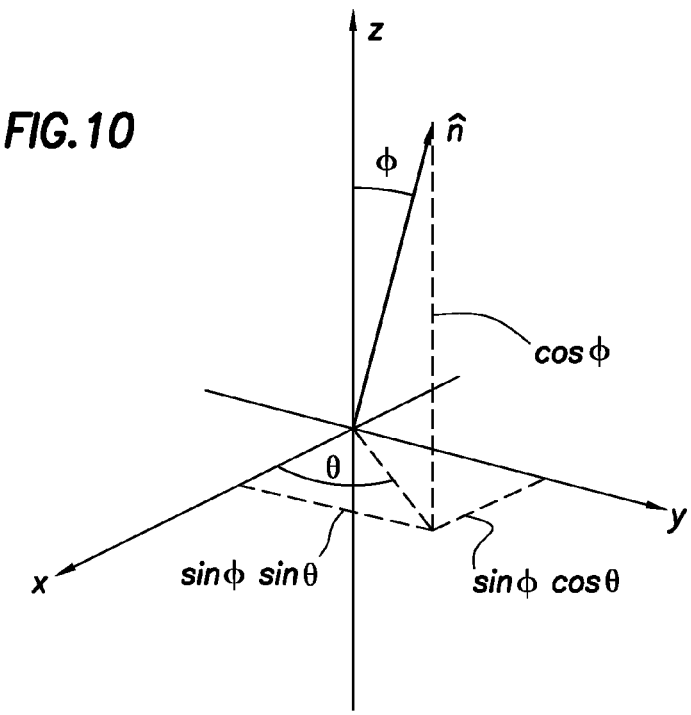
FIG. 10 is a drawing show example orientations of two SAGD wells and the angles between them.

FIG. 10 shows the relative bearings of the two wells and the angles that relate the two wells. The (x,y,z) coordinate system is associated with the second well, where $\hat{z}$ is a unit vector aligned with the borehole axis and pointing toward the drill bit. The unit vector $\hat{x}$ points downward (in the direction of gravity). The $\hat{x}$ direction can be determined from the accelerometers in the MWD tool used in drilling the second well. The first well is aligned with the unit vector $\hat{n}$. The angle between the two wells is $\phi$ and the projection of $\hat{n}$ into the (x,y,0) plane forms an angle $\theta$ with respect to the x-axis. In one example, the second well 16 is directly above the first well 14.

Let the insulated gap 30 in the BHA 22 in the second well be located at z=0, and the bit be located at z=L, where L is the length of the BHA below the insulated gap. A current I(0) is generated across the insulated gap 30 in the second well 16 and flows along the BHA 22 in the second well 16, denoted as I(z). In electrically conductive water based mud (WBM), the current I(z) decreases approximately linearly with distance from the insulated gap 30 and goes to zero at the bit face, so that $I(z) \approx I(0)-(L-|z|)/L$ between the insulated gap 30 and the drill bit 20. Above the insulated gap 30, the current also decreases in a linear manner, but extends further up the drill string. In electrically insulating oil based mud (OBM), the current I(z) remains constant below the insulated gap 30, and enters the formation only through the face of the drill bit 20. In OBM, the current below the insulated gap is given by $I(z) \approx I(0)$. The current returns to the BHA above the gap through stabilizers and through drill collar contact with the formation.

In either case of WBM or OBM, most of the current leaving the BHA in the second well 16 flows to the first well 14, and then returns along the target casing 18. Let the current on the target casing 18 be denoted as I'. In OBM, the current on the casing will be relatively constant along its length, and given by I'≈−I(0). In WBM, the current will vary along the casing as I'≈−I(z) if the separation of the two wells is small compared to L. The current generated across the insulated gap 30, I(0), is measured and transmitted to the surface in real time. Depending on whether the second well 16 is drilled with WBM or OBM, the appropriate approximation for the current I' is used in the following analysis.

The 3-axis magnetometer 58 in the second well 16 is located at (x,y,z)=(0,0, $z_0$) and measures the magnetic field components produced by the current returning on the target casing 18 in the first well 14. To simplify the notation the subscript "1" is not shown hereafter, but it is understood that the following magnetic field refers to that produced by the first well 14, namely $\vec{B}(0,0,z_0)=Bx(0,0,z_0)\hat{x}+By(0,0,z_0)\hat{y}+Bz(0,0,z_0)\hat{z}$. For simplicity, the Earth's magnetic field is neglected in the following analysis, and the BHA 22 in the second well 16 is not rotating. These limitations can be removed. For example, an alternating current will produce an alternating magnetic field that can be differentiated from the Earth's static magnetic field. Alternatively, the source current can be turned on and off, and reversed in direction as previously described. Also, if the BHA 22 in the second well 16 is rotating at a known frequency, then one can transform the magnetometer data from the rotating tool frame to the stationary Earth frame.

The magnetic field components are transmitted in real time to the surface by the MWD tool. By measuring the direction and magnitude of $\vec{B}$ with the magnetometers in the BHA in well #2, and by estimating the current I' on the casing in well #1, it is possible to determine the distance between the two wells and their relative positions and orientations.

Provided that the current I' doesn't vary too much opposite the magnetometer, the magnetic field is given approximately by $$\vec{B}(z) = \frac{\mu_0 I'}{2\pi r^2} \hat{n} \times (-\vec{r}), \quad (1)$$

where $\mu_0=4\pi \cdot 10^{-7}$ Henry/m. Here, $\vec{r}$ is a vector that points from the magnetometers in well #2 to the nearest point on cased well #1. This formula assumes a relatively constant current along the casing in well #1. This assumption is correct for OBM since the source current I(z) is constant along the BHA, and thus the return current I' will be constant on the casing in the vicinity of the magnetometer. In WBM, I(z) varies along the BHA, and hence I' is not constant along the casing. However, if the two wells are separated a distance r much less than L, then I' should not vary too much near the magnetometer. Thus the above formula for the magnetic field is still useful.

Another analytic expression for the magnetic field for the WBM case that may include the variation of current with distance, i.e. I'(z)≈−I(z)≈−I(0)−(L−|z|)/L. This current distribution is characteristic of a linear electric dipole antenna in a conductive medium. An analytic expression for the magnetic field can be found in *Jackson's Classical Electrodynamics*, published by John Wiley & Sons, Inc., 1967, pages 271-273. An analysis can be performed using the expression from Jackson's book, which follows lines similar to that presented here. However, the basic concept is adequately described by the simpler equation for a line current. It is understood that the invention includes using different formula, and that the expression presented here is used solely as an example.

Alternatively, the currents on the BHA 22 and target casing 18 and the resulting magnetic fields can be modeled using a three dimensional numerical code, which allows one to specifically include the drill string, the casing, the borehole, the borehole fluid, and various formation properties, such as bedding. In a numerical approach, a computer model is used to simulate the current distributions on the BHA, in the formation, and on the casing, and to compute the resulting magnetic fields. Comparing the modeled results for the magnetic fields to the measured results allows one to estimate the distance and direction to the cased well. An example of such a numerical code used to model SAGD wells is presented later.

Figure 11:
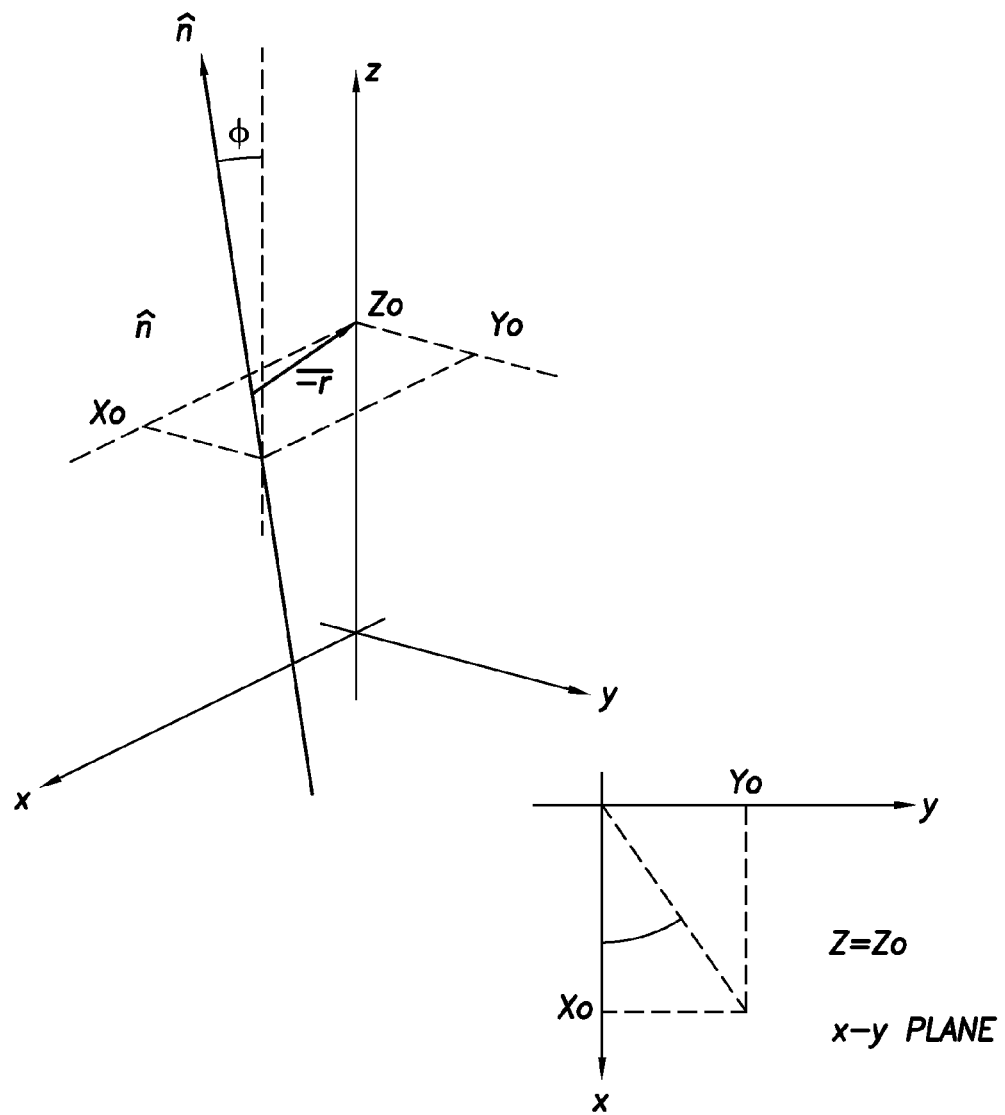
FIG. 11 is a schematic showing an example where the axes of two wells and the radial vector between them.

Assume that the first well penetrates the x-y plane defined by $z=z_0$ at the location $$(x_0, y_0, z_0) \text{ with } \frac{y_0}{x_0} \equiv \tan\gamma_0$$

as shown in FIG. 11. The goal is to determine the quantities: $x_0$, $y_0$, θ, and φ which define the position and direction of cased first well with respect to the BHA in the second well. The measured or known quantities are: I(0), $z_0$, and $\vec{B}(0,0,z_0)$. A mathematical analysis results in the following equations for the magnetic field components due to a current I' on the target casing in the first well, $$Bx(0, 0, z_0) = \frac{\mu_0 I'}{2\pi r_0^2} y_0 \cos\phi, \quad (2)$$

$$By(0, 0, z_0) = -\frac{\mu_0 I'}{2\pi r_0^2} x_0 \cos\phi, \text{ and} \quad (3)$$

$$Bz(0, 0, z_0) = \frac{\mu_0 I'}{2\pi r_0^2} (x_0 \sin\theta - y_0 \cos\theta)\sin\phi, \text{ where} \quad (4)$$

$$r_0 = \sqrt{x_0^2 + y_0^2 - \beta_0^2}, \text{ and } \beta_0 \equiv (-x_0 \cos\theta + y_0 \sin\theta)\sin\phi. \quad (5a,b)$$

For properly drilled SAGD wells, |By(0,0,$z_0$)| will be much larger that |Bx(0,0,$z_0$)| or |Bz(0,0,$z_0$). The relative position and direction of the first well can be deduced from these quantities using the above equations. The angle $\gamma_0$ is determined by the ratio of Bx to By, with $$\frac{Bx}{By} = -\tan\gamma_0 = -\frac{y_0}{x_0}$$

(6) thus eliminating one unknown quantity. If Bx≠0, then $y_0$≠0, and the first well is not directly below the second well. The horizontal displacement ($y_0$) is determined once the vertical separation of the wells ($x_0$) has been found. The ratio of Bz to By gives $$\frac{Bz}{By} = (-x_0 \sin\theta + y_0 \cos\theta)\tan\phi = x_0(\tan\gamma_0 \cos\theta - \sin\theta)\tan\phi.$$

(7) If $Bz \neq 0$, then it is likely that $\phi \neq 0$ and the two wells are not parallel. Finally, By and I' are related to the inter-well spacing by $$r_0^2 = -\frac{\mu_0 I'}{2\pi By} x_0 \cos\phi. \tag{8}$$

Equations 5a and 5b can be used to eliminate $r_0^2$ from equation (8), giving $$x_0^2[1 - \sin^2\phi(-\cos\theta + \tan\gamma_0\sin\theta)^2] + y_0^2 = -\frac{\mu_0 I'}{2\pi By} x_0 \cos\phi. \tag{9}$$

The three equations (6), (7), and (9) relate the four unknown quantities, $x_0$, $y_0$, $\theta$, and $\phi$. There are three equations in four unknowns, so there is not a unique solution for the general case with arbitrary angles and well placements. However, only the data from one single location along the $\hat{z}$ axis has been used so far. Measurements at two locations along the $\hat{z}$ axis provide sufficient data to determine all unknown quantities.

For nearly parallel SAGD wells, it is useful to make the small angle approximation, $\cos\phi \approx 1$, and $\sin\phi \approx \phi$. The normal MWD direction and inclination measurements are sufficiently accurate for the second well to be drilled in the same direction as the second well within a few degrees of error. For example, a relative error of 5° corresponds to $\phi = 0.09$. Hence, with the approximations that $\cos\phi \approx 1$ and $\sin\phi \approx 0$, equations (7) and (9) reduce to:

$$\frac{Bz}{By} \approx x_0(\tan\gamma_0\cos\theta - \sin\theta)\phi \tag{10}$$

$$x_0^2 + y_0^2 \approx -\frac{\mu_0 I'}{2\pi By} x_0. \tag{11}$$

Equation (11) can be rewritten to determine the vertical separation of the wells, $$x_0 \approx -\frac{\mu_0 I'}{2\pi\left[1 + \left(\frac{Bx}{By}\right)^2\right]By}. \tag{12}$$

Equation (6) provides the y coordinate $$y_0 = \frac{\mu_0 I' Bx}{2\pi\left[1 + \left(\frac{Bx}{By}\right)^2\right](By)^2}. \tag{13}$$

Thus, for $\cos\phi \approx 1$, these coordinates $(x_0, y_0, z_0)$ define one point for the axis of the first well, based on measurements were made at one magnetometer location, $(0, 0, z_0)$.

The angles $\theta$ and $\phi$ can be determined from magnetometer measurements at a second point $(0, 0, z_1)$. The two readings may be obtained using two different magnetometers in the BHA, or by moving a single magnetometer between the two locations. Repeating the above process yields a second coordinate for the first well at $(x_1, y_1, z_1)$, where $x_1$ and $y_1$ are obtained from equations (12) and (13), and where $\vec{B}(0, 0, z_1)$ is used instead of $\vec{B}(0, 0, z_0)$. The two resulting coordinates, $(x_0, y_0, z_0)$ and $(x_1, y_1, z_1)$, define the axis of well #1; hence $\theta$ and $\phi$ are determined via $$\tan\theta = \frac{y_1 - y_0}{x_1 - x_0}, \text{ and} \tag{14}$$

$$\tan\phi = \sqrt{\frac{(x_1 - x_0)^2 + (y_1 - y_0)^2}{(z_1 - z_0)^2}}. \tag{15}$$

Thus, all of the desired quantities describing the location and direction of the second well with respect to the first well are obtained.

It is also possible to deduce some directional information about well #2 from measurements at a single point. Referring to equation (10), the two angles $\theta$ and $\phi$ are related via $$\delta \equiv (\tan\gamma_0\cos\theta - \sin\theta)\phi \approx -\frac{2\pi Bz}{\mu_0 I'}\left[1 + \left(\frac{Bx}{By}\right)^2\right]. \tag{16}$$

The right hand side contains measured values. If $Bz = 0$, then $\delta = 0$ which implies that either $$\phi = 0, \text{ or} \tag{17}$$

$$\tan\theta = \tan\gamma_0 \Rightarrow \theta = \gamma_0 + n\pi. \tag{18}$$

The first condition (16) indicates that the two wells are exactly parallel, which is the desired condition for SAGD wells. The second condition (17) implies that the directional vector $\hat{n}$ lies in a plane defined by the $\hat{z}$ axis and $(x_0, y_0, z_0)$. Equation (18) can be satisfied if the wells are not parallel, but they must both lie in the same plane. In this case, they might be diverging from, or converging toward each other.

If $Bz \neq 0$, then $\delta \neq 0$, and both of the following conditions must be true:

$$\phi \neq 0, \text{ and} \tag{19}$$

$$\tan\gamma_0 \cos\theta - \sin\theta \neq 0 \tag{20}$$

Equation (19) indicates that the two wells are not parallel, and equation (20) indicates that the directional vector $\hat{n}$ does not lie in a plane defined by the $\hat{z}$ axis and $(x_0, y_0, z_0)$. Hence a non-zero value for $\delta$ can be used as an error indication and this can be used in a feedback loop to control the direction the second well is being drilled.

Figure 12:
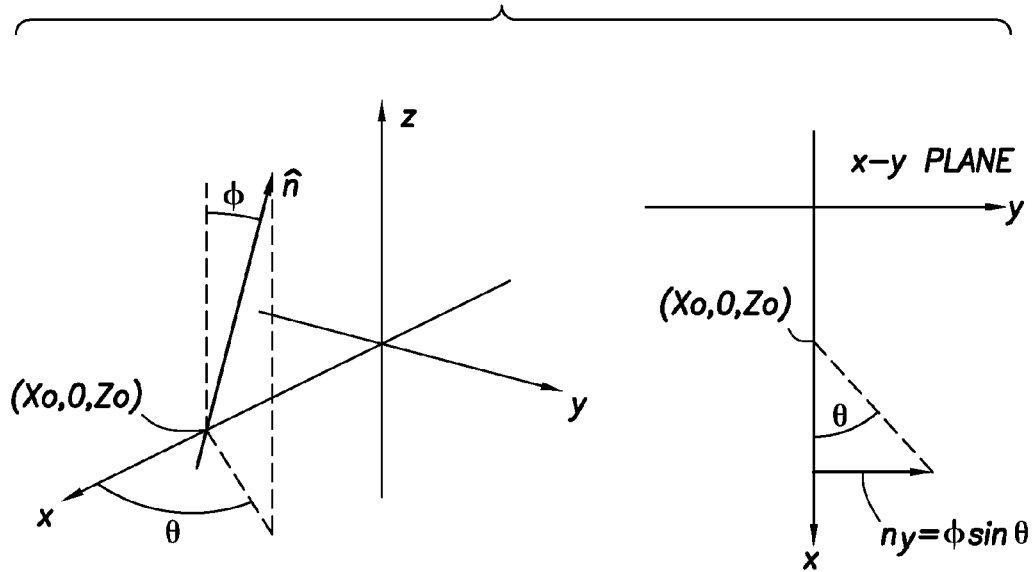
FIG. 12 is a schematic showing one example of the axes of two wells and the radial vector between them when the second well is directly above the first well.

To illustrate, suppose $\gamma_0 = 0$, so that the second well is exactly above the first well at the point $(x_0, 0, z_0)$, as shown in FIG. 12. Equation (16) reduces to $$\delta = -\phi\sin\theta \tag{21}$$

Note that the component of $\hat{n}$ that lies along the $\hat{y}$ direction is $$n_y = \hat{n}\hat{y} = \sin\phi\sin\theta \approx \phi\sin\theta. \tag{22}$$

Hence the quantity $\delta$ is a direct measurement of the misalignment of the two wells with respect to the $\hat{y}$ direction. A tendency to drift to the left or right would be detected by monitoring $\delta$, and subsequently corrected. However, $\delta$ cannot indicate a drift upwards or downwards.

Figure 13:
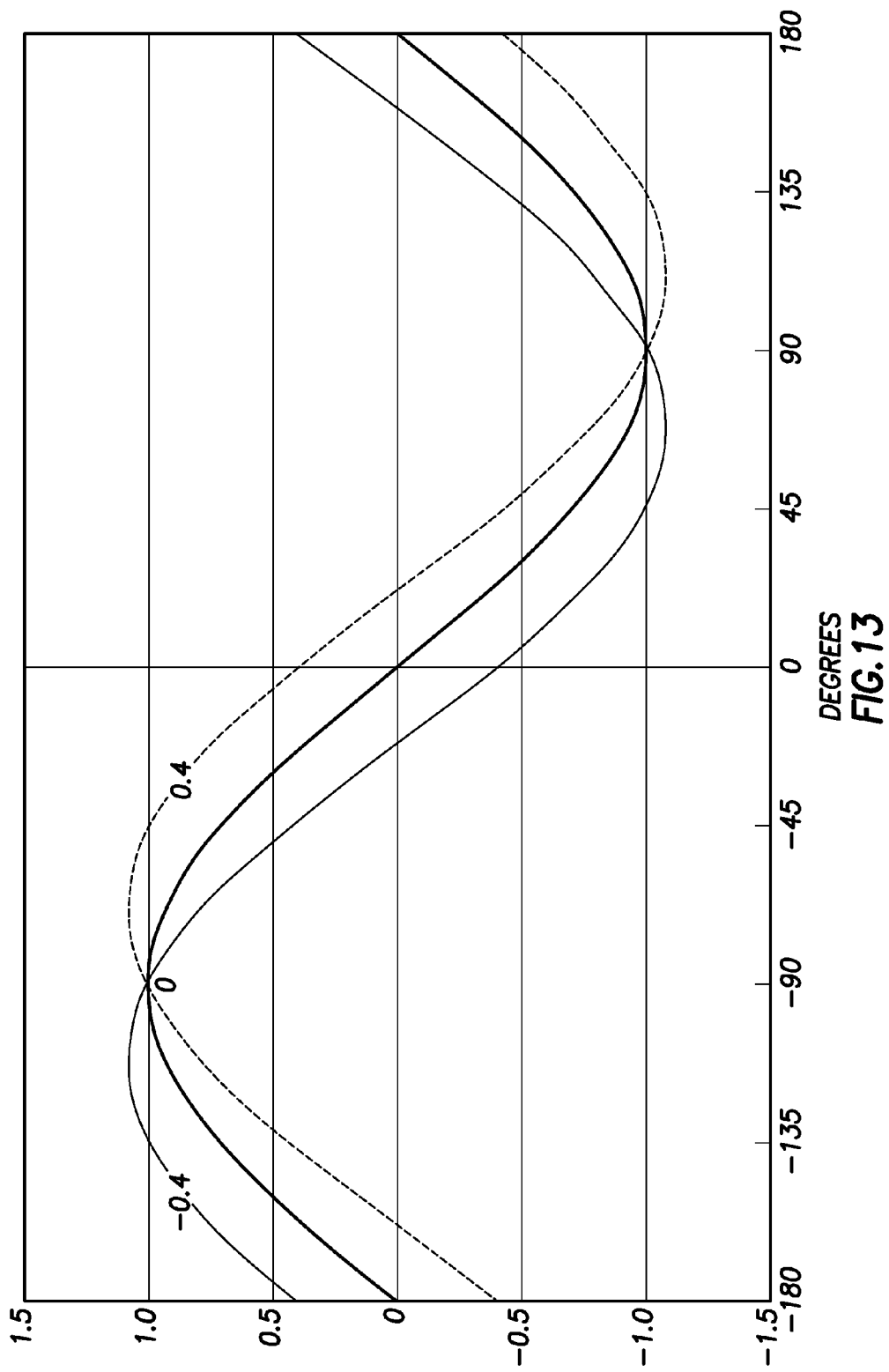
FIG. 13 is a plot of $(\tan \gamma_0 \cos \theta - \sin \theta)$ as a function of $\theta$ for $\tan \gamma_0 = -0.4, 0, +0.4$.

In the general case when $\tan\gamma_0 \neq 0$, the quantity $\delta$ is still useful as a feedback correction. In this case, it corresponds to the portion of $\hat{n}$ that is perpendicular to the plane defined by the $\hat{z}$ axis and the point $(x_0, y_0, z_0)$. For example suppose $\tan\gamma_0 = 0.4$, corresponding to $\gamma_0 = 0.381$ or 21.8°. Referring to FIG. 13, which is a plot of $(\tan\gamma_0 \cos\theta - \sin\theta)$, the zero-crossing occurs at 21.8°, so that driving δ to zero will bring the two wells into the plane defined by the $\hat{z}$ axis and the point ($x_0$, $y_0, z_0$).

An automatic feedback and control system can be implemented downhole to steer the second well. Assume that initially the two wells have the proper inter-well spacing (r=d), parallel trajectories (φ=0), and the second well is above the first well ($\gamma_0$=0), so that the error signal δ is zero. If δ deviates from zero, this indicates a left-to-right tendency. The direction of the second well could be changed to bring δ back to zero and hence correct the left-to-right drift. Since this corresponds to simply driving Bz to zero, it does not require any additional information downhole. A downhole processor in the BHA of the second well would be able to monitor Bz and control the direction to maintain the two wells in the same plane.

However, there remains the possibility that the two wells could drift towards each other or away from each other. The correct spacing can be obtained by monitoring the amplitude of By. From equation (12), $$x_0 \approx -\frac{\mu_0 I'}{2\pi By}. \quad (23)$$

With I' constant, a change in By can be interpreted as a change in spacing. The difference in By from its desired value may be used as an error signal. A processor in the BHA of the second well would be able to monitor By and Bz and automatically control the separation of the two wells.

This preceding analysis is meant to illustrate the principles, not to limit the invention. The simplifying assumptions for the current and magnetic field are not essential to the method. For example, an alternative approach is to use a fully three dimensional modeling code to predict the currents and magnetic field as a function of the well spacing, the relative well orientation, the details of the BHA and casing, and varying formation properties. A commercially available electromagnetic modeling code, such as Comsol Multiphysics, can be used to calculate the currents and magnetic field. The procedure is: 1) model a variety of realistic conditions (e.g. well spacing, well orientation, formation resistivity, borehole diameter, mud resistivity, BHA diameter and length, casing diameter, etc.), 2) compare the model results with the real time measurements, 3) determine the relative orientation and inter-well spacing, and 4) correct the trajectory of the well being drilled.

Figure 14:
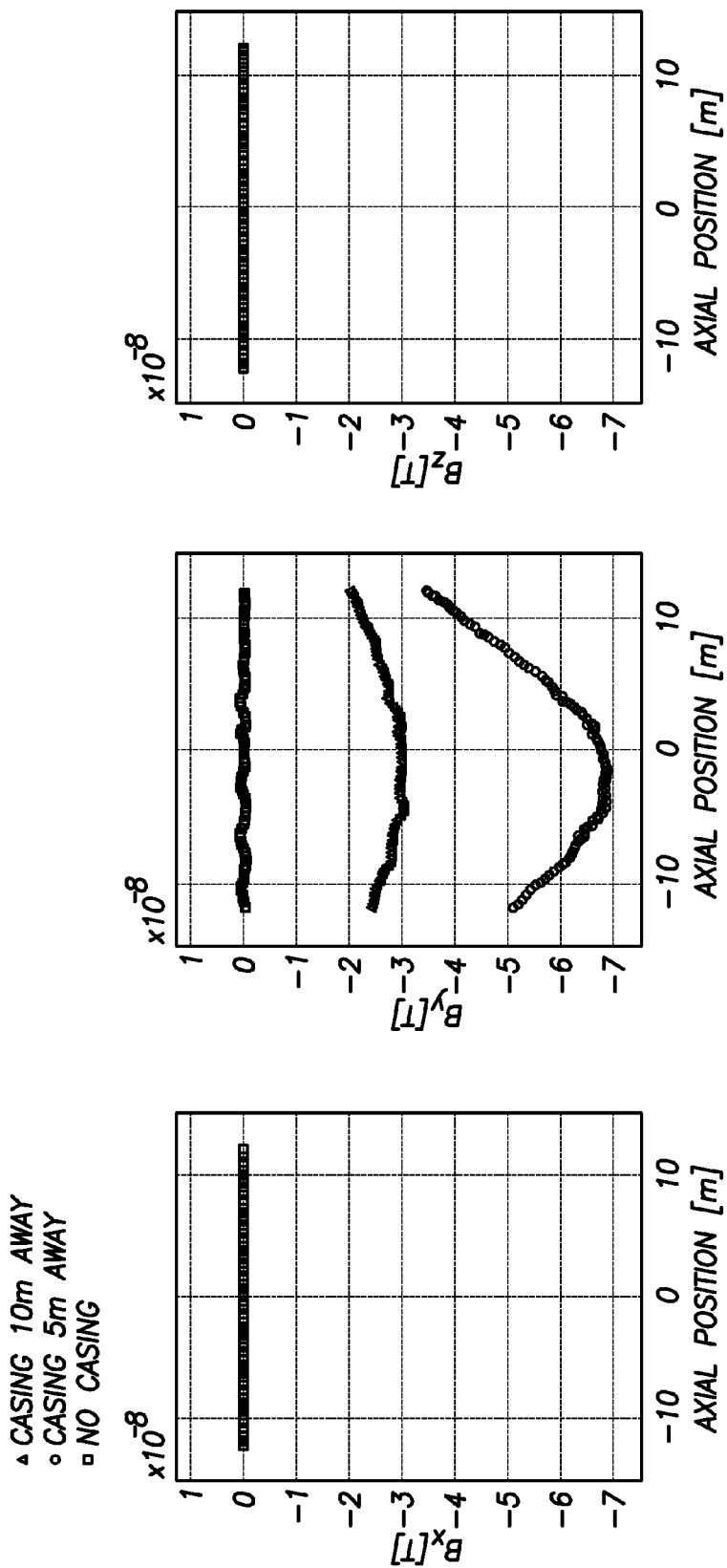
FIG. 14 is a plot of the magnetic field components for the example when a second well is parallel to a first well and there are inter-well spacings of 5 m and 10 m. Also shown are the magnetic field components when the first is not present.
Figure 15:
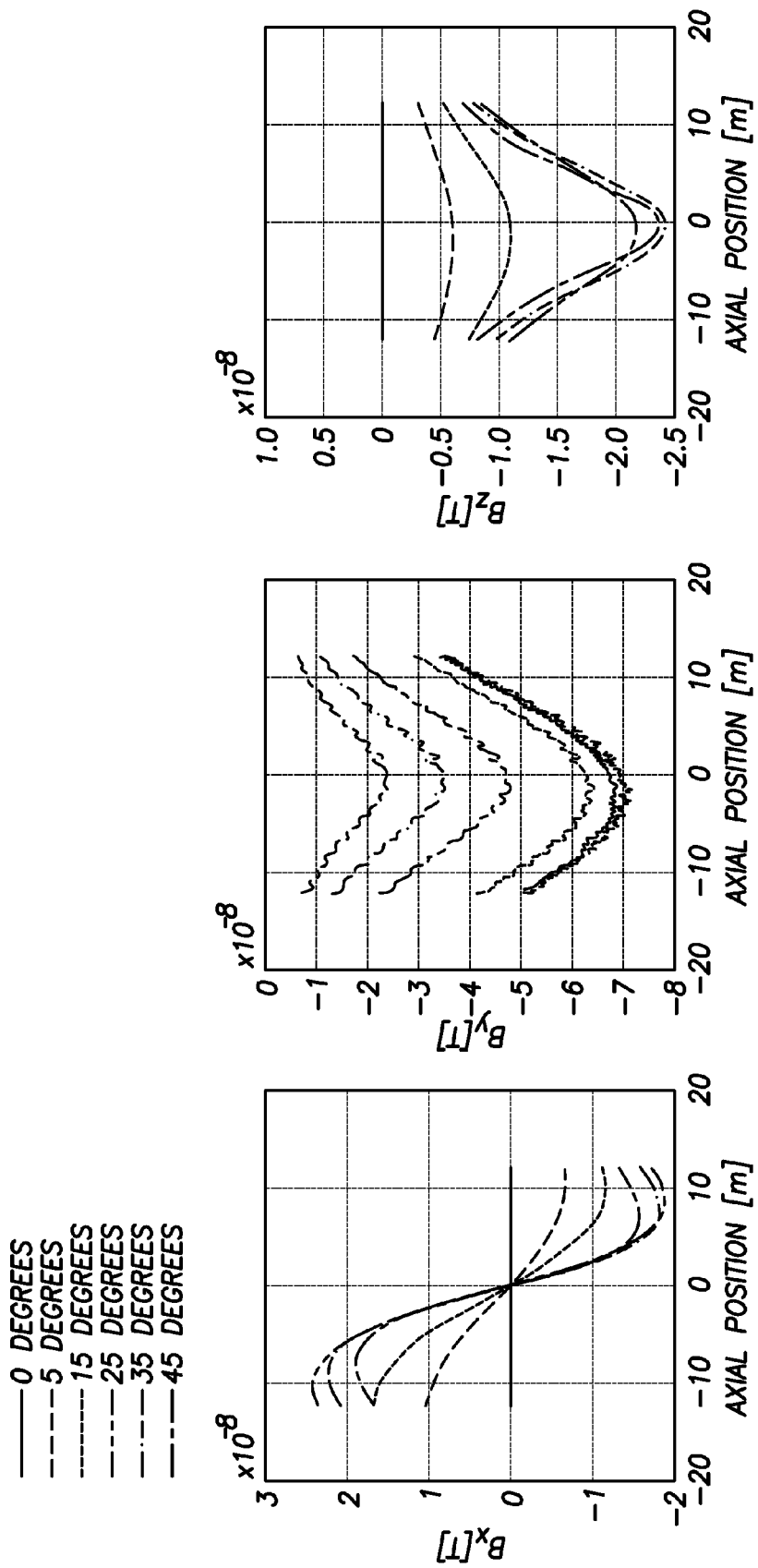
FIG. 15 is a plot of the magnetic field components for the example when a second well is tiled at an angle φ with respect to a first well and with an inter-well spacing of 5 m.

For example, a three dimensional numerical calculation for a 6.75-inch (0.172 m) diameter BHA is shown in FIGS. 14 and 15. The length of BHA below the insulated gap is 40 feet (12.2 m), and the length of the insulated gap is 28-inches (0.71 m). The casing in the first well is 12-inches in diameter (0.305 m). The formation resistivity is 10 ohm-m, and WBM is assumed. The current generated across the gap I(0) is 1 amp.

In FIG. 14, the magnetic field components are calculated for the case when the second well is parallel to the first well (φ=0) and exactly above it ($y_0$=0). There are two inter-well separations modeled, 16.4 feet (5 m) and 32.8 ft (10 m). The case with no casing present has also been modeled. The magnetic field is calculated as a function of $z_0$ along the BHA. Each data point corresponds to the potential position of the magnetometer in the BHA. When there is no casing present, the three components of the magnetic field are zero, as expected since the current returns symmetrically though the formation. When a casing is present in the first well, Bx(0,0,z)=Bz(0,0,z)=0 as predicted by equations 2 and 4. The only component of magnetic field is By(0,0,z), whose magnitude depends on the inter-well spacing. The signal at 5 m spacing is approximately double the signal at 10 m spacing. Equation 3 gives a rough approximation for the magnetic field produced by the numerical model $$By(0, 0, z_0) \approx -\frac{\mu_0 I(0)(L-|z|)}{2\pi L x_0}. \quad (24)$$

The current decreases away from the insulated gap, and the inter-well spacing, $x_0$, can be deduced from the magnitude.

In FIG. 15, the second well is cased and is not parallel to the first well, but is tilted at different angles, φ. The second well intersects the z=0 plane at (x,y,z)=($x_0$,0,0), i.e. it intersects the x-axis. The second well is parallel to the y-z plane, with θ=π/2. The wells are separated by 16.4 feet (5 m). The three components of the magnetic field calculated with a three dimensional numerical model also follow the shapes predicted by equations 2, 3, and 4. Note that $x_0$ is a constant, while y and z vary. In particular, y=z tan φ, so that y is the dependent variable, and z is an independent variable for a given value of φ. The approximate equations for the magnetic field components become:

$$Bx(0, 0, z) \approx -\frac{\mu_0 I(0)(L-|z|)}{2\pi L r^2} y\cos\phi = -\frac{\mu_0 I(0)(L-|z|)}{2\pi L(x_0^2 + z^2\sin^2\phi)} z\sin\phi, \quad (25)$$

$$By(0, 0, z) \approx -\frac{\mu_0 I(0)(L-|z|)}{2\pi L r^2} x_0 \cos\phi = \quad (26)$$
$$-\frac{\mu_0 I(0)(L-|z|)}{2\pi L(x_0^2 + z^2\sin^2\phi)} x_0 \cos\phi, \text{ and}$$

$$Bz(0, 0, z) \approx -\frac{\mu_0 I(0)(L-|z|)}{2\pi L r^2} x_0 \sin\phi = -\frac{\mu_0 I(0)(L-|z|)}{2\pi L(x_0^2 + z^2\sin^2\phi)} x_0 \sin\phi. \quad (27)$$

The magnitude of Bx(0,0,z) scales approximately as cos φ, and is anti-symmetric about z=0. The anti-symmetry results from z changing sign, while the magnitude grows initially with z until the L−|z| term dominates. The magnitude of By(0,0,z) also scales approximately as cos φ, but is symmetric about z=0 as expected. It peaks near z=0 and falls off with distance as the current decreases. The magnitude of Bz(0,0,z) scales approximately as sin φ and is symmetric about z=0 as predicted by the above formula.

Hence, the three dimensional numerical model produces results that generally consistent with the much simpler analytic model derived here. The three dimensional numerical model can be used to create a database consisting of magnetic field components versus various conditions (well spacing, well orientation, casing size, BHA length and diameter, formation resistivity, etc.). This database can then be used to create equations relating the various parameters to the magnetic field. For example, the form of such equations might resemble equations 25, 26, and 27. The measured magnetic fields can then be used to invert for the desired parameters, particularly the inter-well spacing and the relative orientation of the two wells. An independent measurement of the formation resistivity, for example from an LWD tool, could also be used to refine the parameters.

From the foregoing detailed description of specific embodiments of the invention, it should be apparent that an apparatus, system and method for locating a target wellbore from a second wellbore during drilling of the second wellbore that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A wellbore tool for locating a target wellbore containing a conductive member from a second wellbore, the tool comprising:
    an electric current driver generating a current in the second wellbore; and
    a magnetometer positioned above the electric current driver,
    wherein the current driver generates an electric current in the second wellbore, and further wherein the magnetometer is configured to respond to a magnetic field induced by a current flowing in the conductive member in the target wellbore.

2. The tool of claim 1, wherein the electric current is a low frequency current.

3. The tool of claim 1, further including a hollow tubular positioned between the magnetometer and the electric current driver.

4. The tool of claim 1, wherein the magnetometer is a three-axis magnetometer.

5. The tool of claim 1, further comprising an insulated gap positioned between the electric current driver and the magnetometer.

6. The tool of claim 5, wherein at least a portion of the electric current generated by the electric current driver travels to a portion of the second wellbore below the insulated gap.

7. The tool of claim 1, wherein the electric current driver generates current such that at least a portion of the current enters formation about the second wellbore and the conductive member in the target wellbore.

8. A wellbore tool for locating a target wellbore containing a conductive member from a second wellbore and directing the trajectory of the second wellbore relative to the target wellbore, the tool comprising:
    an electric current driver for generating a current at the second wellbore;
    a magnetometer positioned above the electric current driver; and
    a drill bit positioned below the magnetometer,
    wherein the current driver generates an electric current such that at least a portion of the electric current travels to the conductive member of the second wellbore, and further wherein the magnetometer is configured to respond to a magnetic field induced by a current flowing in the conductive member in the target wellbore.

9. The wellbore tool of claim 8 further comprising an insulated gap positioned between the electric current driver and the magnetometer.

10. The wellbore tool of claim 8 further comprising an insulated gap positioned between the electric current driver and the magnetometer.

11. The wellbore tool of claim 8 wherein the magnetometer is a three-axis magnetometer.

12. The wellbore tool of claim 8 wherein the magnetometer is positioned within a magnetic tubular.

13. The wellbore tool of claim 8 wherein the magnetometer measures Earth's magnetic field before current is generated at the electric current driver and measures the magnetic field induced by the current flowing in the conductive member in the target wellbore.

14. A method of locating a target wellbore containing a conductive member from a second wellbore and directing the trajectory of the second wellbore relative to the target wellbore, the method comprising the steps of:
    positioning a drill string in the wellbore;
    drilling a second wellbore toward the target wellbore;
    generating a current in the second wellbore such that a portion of the current is received by the conductive member;
    generating a target magnetic field at the conductive member in the target wellbore based on the current received from the second wellbore;
    measuring the target magnetic field at a magnetometer positioned on the drill string in the second wellbore, wherein the magnetometer is positioned above a current driver generating the current in the second wellbore; and
    determining a position of the second wellbore relative to the target wellbore.

15. The method of claim 14, wherein the step of measuring the target magnetic field is performed while drilling the second wellbore.

16. The method of claim 14, further comprising positioning an insulated gap in the drill string in the second wellbore.

17. The method of claim 16, wherein a portion of the current flows to the conductive member in the target wellbore thereby producing a target magnetic field and another portion of the current flows along the drill string below the insulated gap.

18. The method of claim 14, further comprising measuring the earth's magnetic field, and wherein determining the position of the second wellbore comprises determining the position of the second wellbore from the target magnetic field measurement and the earth's magnetic field measurements.

19. The method of claim 14, further comprising steering the second wellbore along a trajectory relative to intersect the target wellbore.

20. The method of claim 14 wherein the step of generating a current in the second wellbore is performed with a drill bit connected to the drill string.

21. A wellbore tool for locating a target wellbore containing a conductive member from a second wellbore, the tool comprising:
    an electric current driver configured to generate an electric current in the second wellbore; and
    a magnetometer positioned below the electric current driver, wherein the current driver generates an electric current in the second wellbore, and further wherein the magnetometer is configured to respond to a magnetic field induced by a current flowing in the conductive member in the target wellbore.

22. The tool according to claim 21, wherein the electric current is a low frequency current.

23. The tool according to claim 21, further comprising:
    a hollow tubular positioned between the magnetometer and the electric current driver.

24. The tool according to claim 21, wherein the magnetometer is a three-axis magnetometer.

25. The tool according to claim 21, further comprising:
    an insulated gap positioned between the electric current driver and the magnetometer.

26. The tool according to claim 25, wherein at least a portion of the electric current generated by the electric current driver travels to a portion of the second wellbore below the insulated gap.

27. The tool according to claim 21, wherein the electric current driver generates current such that at least a portion of the current enters formation about the second wellbore and the conductive member in the target wellbore.

28. A wellbore tool for locating a target wellbore containing a conductive member from a second wellbore and directing the trajectory of the second wellbore relative to the target wellbore, the tool comprising:
- an electric current driver configured to generate a current at the second wellbore;
- a magnetometer positioned below the electric current driver; and
- a drill bit positioned below the magnetometer,
- wherein the current driver generates an electric current such that at least a portion of the electric current travels to the conductive member of the second wellbore, and further wherein the magnetometer is configured to respond to a magnetic field induced by a current flowing in the conductive member in the target wellbore.

29. The wellbore tool according to claim 28, further comprising:
- an insulated gap positioned between the electric current driver and the magnetometer.

30. The wellbore tool according to claim 28, further comprising:
- an insulated gap positioned between the electric current driver and the magnetometer.

31. The wellbore tool according to claim 28, wherein the magnetometer is a three-axis magnetometer.

32. The wellbore tool according to claim 28, wherein the magnetometer is positioned within a magnetic tubular.

33. The wellbore tool according to claim 28, wherein the magnetometer measures Earth's magnetic field before current is generated at the electric current driver and measures the magnetic field induced by the current flowing in the conductive member in the target wellbore.

34. A method of locating a target wellbore containing a conductive member from a second wellbore and directing a trajectory of the second wellbore relative to the target wellbore comprising:
- positioning a drill string in the second wellbore;
- drilling a second wellbore toward the target wellbore;
- generating a current in the second wellbore such that a portion of the current is received by the conductive member;
- generating a target magnetic field at the conductive member in the target wellbore based on the current received from the second wellbore;
- measuring the target magnetic field with a magnetometer positioned on the drill string in the second wellbore; and
- determining a position of the second wellbore relative to the target wellbore.

35. The method according to claim 34, wherein the step of measuring the target magnetic field is performed while drilling the second wellbore.

36. The method according to claim 34, further comprising:
- positioning an insulated gap in the drill string in the second wellbore.

37. The method according to claim 36, wherein a portion of the current flows to the conductive member in the target wellbore thereby producing a target magnetic field and another portion of the current flows along the drill string below the insulated gap.

38. The method according to claim 34, further comprising:
- measuring the earth's magnetic field, and wherein determining the position of the second wellbore comprises determining the position of the second wellbore from the target magnetic field measurement and the earth's magnetic field measurements.

39. The method according to claim 34, further comprising:
- steering the second wellbore along a trajectory relative to intersect the target wellbore.

40. The method according to claim 34, wherein the step of generating a current in the second wellbore is performed with a drill bit connected to the drill string.

* * * * *